United States Patent [19]

Yamasaki et al.

[11] Patent Number: 4,978,990
[45] Date of Patent: Dec. 18, 1990

[54] EXPOSURE CONTROL APPARATUS FOR CAMERA

[75] Inventors: Masafumi Yamasaki; Toshiyuki Toyofuku; Junichi Itoh, all of Hachioji; Shinichi Kodama, Hino, all of Japan

[73] Assignee: Olympus Optical Co., Ltd., Tokyo, Japan

[21] Appl. No.: 415,179

[22] Filed: Sep. 29, 1989

[30] Foreign Application Priority Data

Oct. 4, 1988 [JP] Japan .................. 63-250464
Oct. 4, 1988 [JP] Japan .................. 63-250467

[51] Int. Cl.$^5$ .............................. G03B 7/08
[52] U.S. Cl. ..................... 354/432; 354/412
[58] Field of Search ............ 354/429, 432, 412

[56] References Cited

U.S. PATENT DOCUMENTS

| | | | |
|---|---|---|---|
| 4,412,730 | 11/1983 | Saegusa et al. | 354/432 |
| 4,453,811 | 6/1984 | Yamasaki | 354/412 |
| 4,529,289 | 7/1985 | Tsunefuji et al. | 354/433 |
| 4,571,049 | 2/1986 | Tsunefuji et al. | 354/412 |
| 4,589,754 | 5/1986 | Maitani et al. | 354/433 |
| 4,589,755 | 5/1986 | Maitani et al. | 354/431 |
| 4,589,757 | 5/1986 | Maitani et al. | 354/458 |
| 4,618,238 | 10/1986 | Maitani et al. | 354/433 |

FOREIGN PATENT DOCUMENTS 61-173226 8/1986 Japan .

Primary Examiner—Russell E. Adams
Attorney, Agent, or Firm—Frishauf, Holtz, Goodman & Woodward

[57] ABSTRACT

An optical image of an object is incident on a light-receiving unit of a two-dimensional matrix through a photographing lens. An output from the light-receiving unit is input to a first arithmetic logic unit to calculate an actual object brightness value in consideration of an aperture value of an aperture. An output from the first arithmetic logic unit is input to a multiplexer and a neural network. The neural network determines a main part of the object from brightness value pattern as a set of brightness values of the photoelectric transducer elements and outputs a position signal representing the main part. A multiplexer selectively passes only brightness values of the photoelectric transducer elements corresponding to the main part of the object from the outputs from the first arithmetic logic unit. An output from the multiplexer is supplied to a second arithmetic logic unit, and the second arithmetic logic unit calculates an APEX calculation on the basis of a speed value, an aperture value, a time value, and a mode signal representing a shutter or aperture priority operation, thereby determining a shutter speed or an f-number.

20 Claims, 13 Drawing Sheets

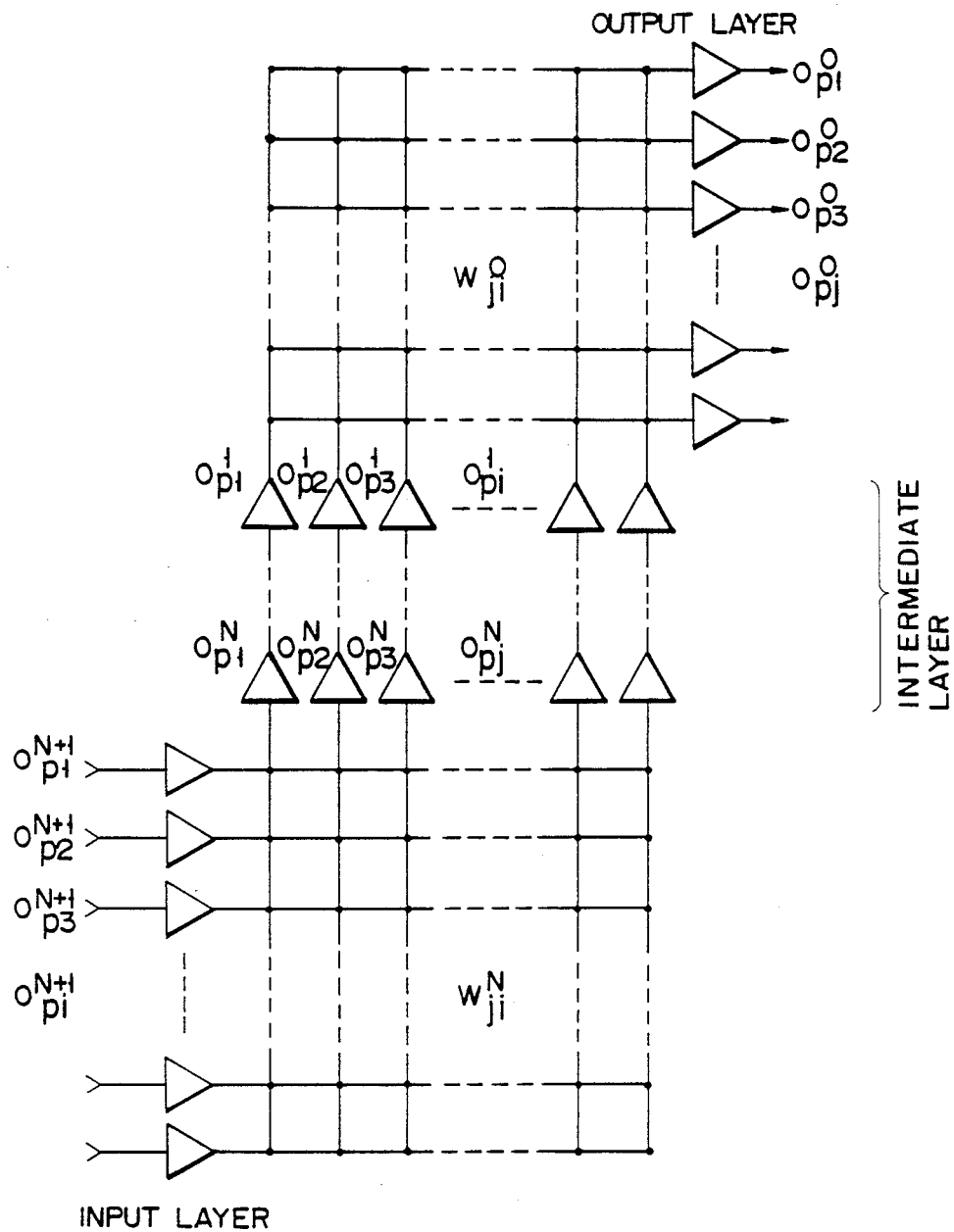
F I G. 2

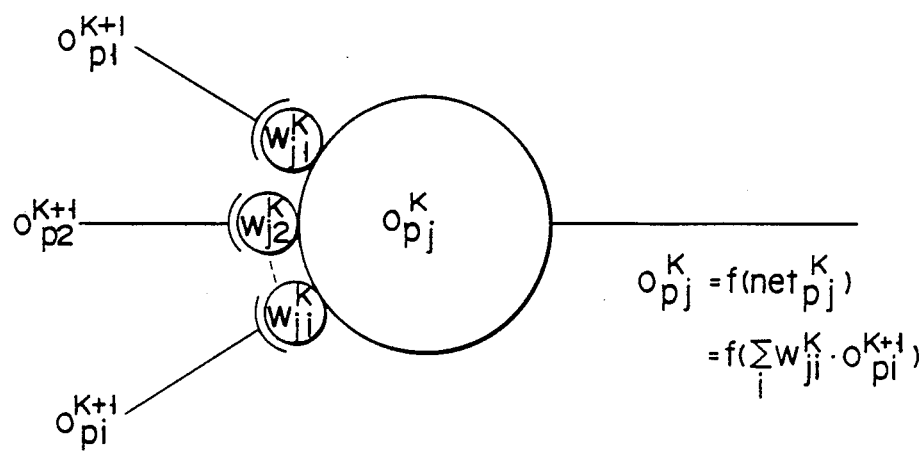
F I G. 3
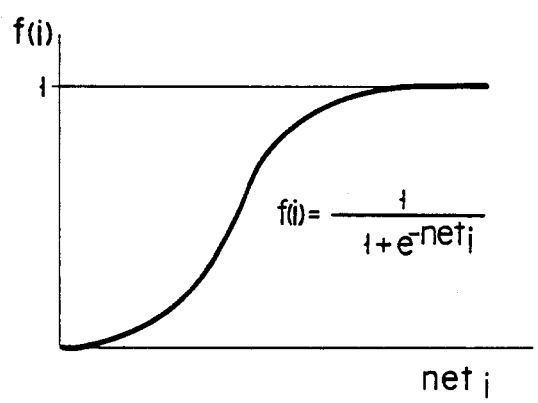
F I G. 4

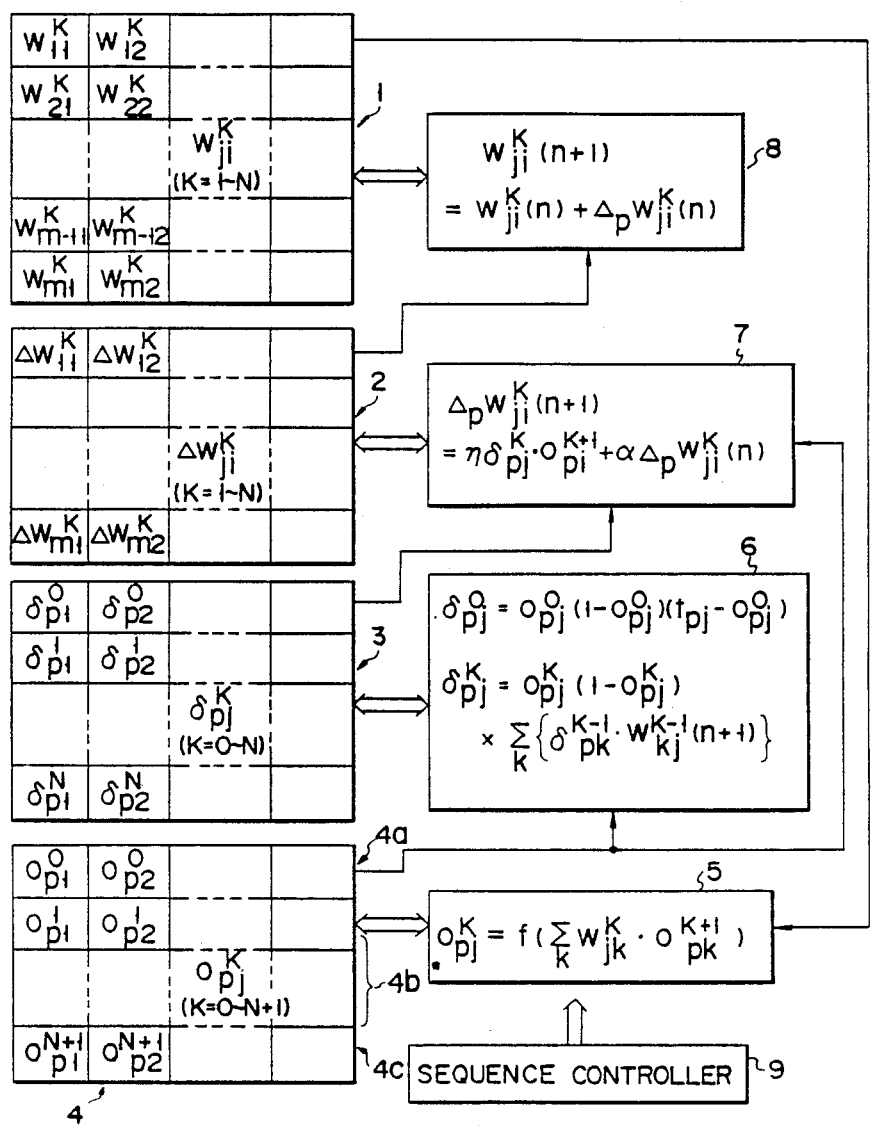
F I G. 5

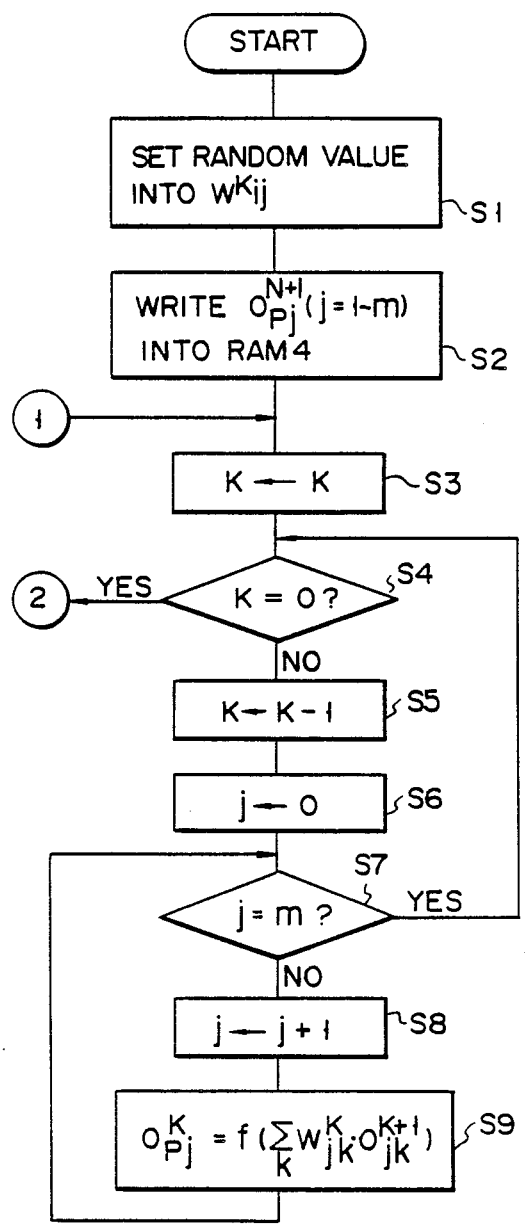
F I G. 6

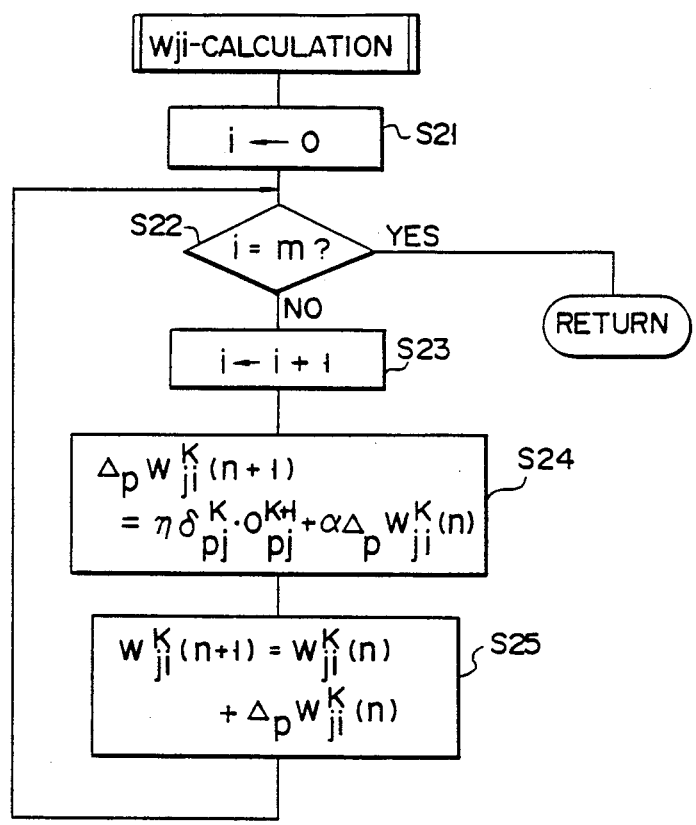
F I G. 8

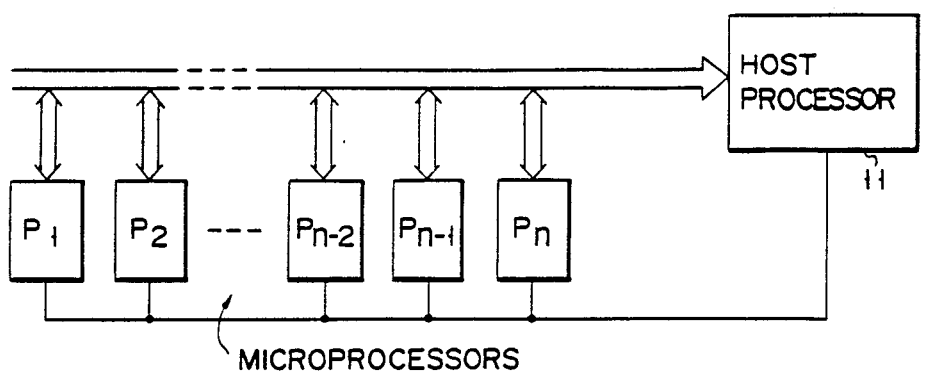
F I G. 10
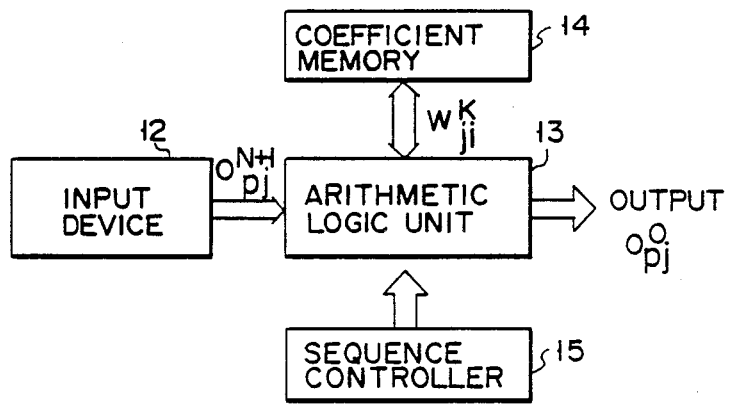
F I G. 11
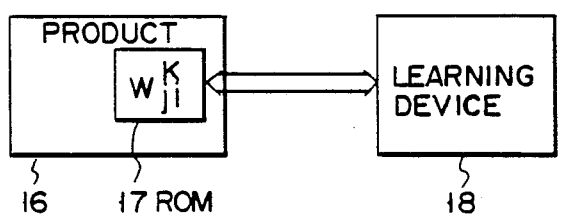
F I G. 12

| $P_{11}$ | $P_{12}$ | | | $P_{1n}$ |
|---|---|---|---|---|
| $P_{21}$ | $P_{22}$ | | | $P_{2n}$ |
| | | | | |
| | | | | |
| $P_{m1}$ | $P_{m2}$ | | | $P_{mn}$ |

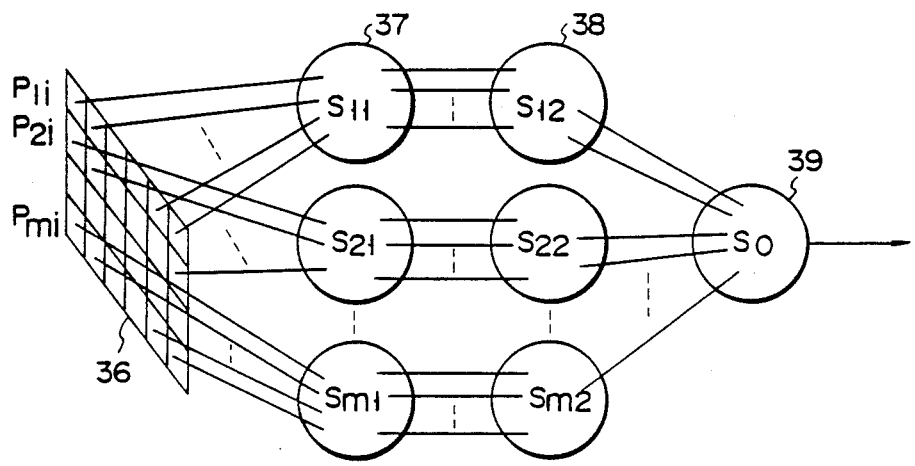
F I G. 15
| P11 | P12 | P13 | P14 | P15 | P16 | P17 |
| --- | --- | --- | --- | --- | --- | --- |
| P21 | P22 | P23 | P23 | P25 | P26 | P27 |
| P31 | P32 | P33 | P34 | P35 | P36 | P37 |
| P41 | P42 | P43 | P44 | P45 | P46 | P47 |
F I G. 16

EXPOSURE CONTROL APPARATUS FOR CAMERA

BACKGROUND OF THE INVENTION

Field of the Invention

The present invention relates to an exposure control apparatus for a camera capable of performing photographing at an exposure value which is satisfactory to some extent for all objects.

A typical conventional exposure control apparatus is disclosed in Japanese Patent Disclosure No. 57-42026 (U.S. Pat. No. 4,412,730). There is described a multiphotometric apparatus in which an object is divided into a plurality of areas, and the plurality of areas are photometrically measured to output a plurality of photometric outputs respectively corresponding to the plurality of areas. One of a maximum brightness level, an intermediate brightness level between the maximum brightness level and an average brightness level, the average brightness level, an intermediate brightness level between the average brightness level and a minimum brightness level, and the minimum brightness level is selected based on the maximum brightness level to control the exposure. Japanese Patent Disclosure No. 61-173226 discloses a technique for detecting a back light state from a spot photometric value at a central portion of a field of view and an average photometric value for the entire field of view and performing a caution display or correcting an exposure value, wherein a detection error can be eliminated by using an object distance information in back light detection.

These conventional examples can cope with only limited object patterns since they recognize object patterns using microcomputers, or perform erroneous detection to produce an undesired photograph. When it is desired that a correct exposure control is performed for many object patterns, the object patterns and brightness levels cannot be standardized, thus resulting in a large program size and an increase in calculation time. In addition, even if a photograph is obtained as designed by a manufacturer, evaluation of photographs depends on individual senses. Therefore, the resultant photographs are not always best to the respective users.

SUMMARY OF THE INVENTION

It is an object of the present invention to provide an exposure control apparatus for allowing a user to take pictures of all objects at desired exposure values by determining optimal exposure parameters for all object patterns by using a neural network for generating a desired output for each individual input.

It is another object of the present invention to provide an exposure control apparatus for detecting a main part of an object in accordance with an object pattern and determining an exposure value in accordance with a spot photometric value of an brightness of the main part.

It is still another object of the present invention to provide an exposure control apparatus for calculating an exposure correction value in accordance with an object pattern and determining an exposure value on the basis of an average photometric value which is corrected by exposure correction value.

An exposure control apparatus according to the present invention comprises a plurality of photoelectric transducer elements, arranged in a two-dimensional matrix, for detecting a brightness of an object; a back propagation model type neural network, formed of a large number of units coupled at predetermined strengths determined by pre-learning, for receiving outputs from the plurality of photoelectric transducer elements and calculating an exposure value; and a device for controlling exposure in accordance with an output from the neural network.

Another exposure control apparatus according to the present invention comprises a light-receiving unit, formed of a plurality of photoelectric transducer elements arranged in a two-dimensional matrix, for outputting analog signals representing brightnesses of respective parts of an object; a converter for converting the analog signal output from the light-receiving unit into digital signal; a neural network for receiving the digital signals and determining a main part of the object; a multiplexer for selecting a signal representing the brightness of the determined main part of the object from the digital signals; and a device for performing exposure control on the basis of a output from the multiplexer.

Still another exposure control apparatus according to the present invention comprises a light-receiving unit, formed of a plurality of photoelectric transducer elements arranged in a two-dimensional matrix, for outputting analog signals representing brightnesses of respective parts of an object; a converter for converting the analog signals output from the light-receiving unit into digital signals; a neural network for receiving the digital signals and determining an exposure correction value; an arithmetic logic unit for obtaining an average value of brightnesses of the respective parts of the object from outputs from the light-receiving unit; and a device for correcting the average value of the brightnesses with the exposure correction value and performing exposure control on the basis of a corrected value.

BRIEF DESCRIPTION OF THE DRAWINGS

FIG. 2 is a view showing a model of a neural network used in the present invention;

FIG. 3 is a view showing a model of each unit constituting the neural network;

FIG. 4 is a view showing a logistic function;

FIG. 5 is a block diagram of a back propagation model type neural network;

FIGS. 6 to 9 are flow charts showing simulation for simulating the neural network of FIG. 5 by using a Neumann type computer, in which FIG. 6 is a flow chart for calculating an output of each unit, FIG. 7 is a flow chart for obtaining an amount of back propagation of an error, FIG. 8 is a flow chart for calculating a coupling strength coefficient, and FIG. 9 is a flow chart for judging a learning level;

FIG. 10 is a block diagram of a parallel processing system for realizing the neural network shown in FIG. 5;

FIG. 11 is a block diagram of an apparatus which applies a learning result;

FIG. 12 is a block diagram for causing the apparatus which applies a learning result to learn;

FIG. 15 is a view showing a neural network of the first embodiment;

FIG. 16 is a view showing the detailed layout of photoelectric transducer elements;

FIGS. 16A to 17C are views showing examples of an object to be learnt by the neural network.

DETAILED DESCRIPTION OF THE PREFERRED EMBODIMENTS

Figure 1:
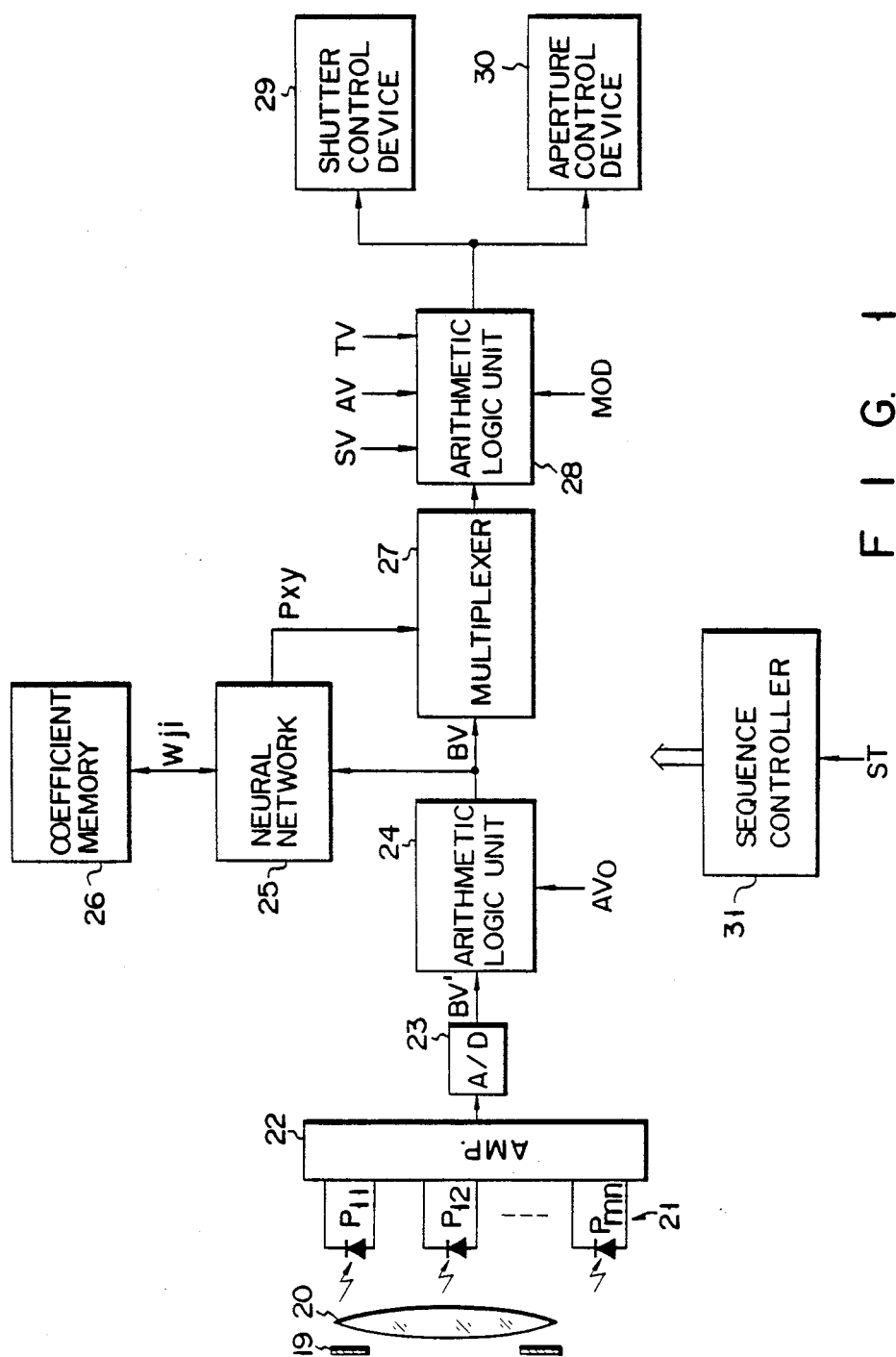
FIG. 1 is a block diagram of an exposure control apparatus according to a first embodiment of the present invention.

An exposure control apparatus according to an embodiment of the present invention will be described with reference to the accompanying drawings. FIG. 1 is a block diagram showing an arrangement of a first embodiment. As is apparent from FIG. 1, this embodiment uses a neural network to perform exposure control. The neural network will be described prior to a description of the embodiment with reference to FIGS. 2 to 12.

FIG. 2 shows a model of a neural network. This model is proposed by Rumlhart et al and is called a back projection model (to be referred to as a BP model hereinafter). The neural network is formed of a large number of units (neurons). The units are classified into an input layer, an intermediate layer, and an output layer. The input and output layers are single layers, but the intermediate layer may be a single layer or a plurality of layers. The units are connected in a direction of the input layer, the intermediate layer, and the output layer in that order to constitute a network. The coupling strength between the units is determined by learning. However, there are no connections between the units within each layer. A model of each unit is shown in FIG. 3.

The principle of a learning algorithm of a BP model will be described below. An error $E_{pj}$ between an actual output value and a desirable output value is given as follows:

$$E_{pj} = 0.5(t_{pj} - O_{pj}^0)^2 \quad (1)$$

where $O_{pj}^0$ is the actual output value appearing at the output layer when a given pattern P is input to the input layer, and $t_{pj}$ is the desired output value (to be referred to as a teacher signal hereinafter) at that time.

In order to cause the network to learn, all the coupling strengths are changed to reduce the error $E_{pj}$.

A change in coupling strength coefficient $W_{ji}$ for the jth unit of the Kth layer from the ith unit of the (K-1)th layer upon input of the pattern P is defined as follows. In this case, K designates the layer and increases from the output layer side given as "0" toward the input layer side.

$$\Delta_p W_{ji}^k \propto -\partial E_p / \partial W_{ji}^k \quad (2)$$

$$\partial E_p / \partial W_{ji}^k = (\partial E_p / \partial net_{pj}^k) \cdot (\partial net_{pj}^k / \partial W_{ji}^k) \quad (3)$$

for $$net_{pj}^k = \sum_K W_{jk}^k \cdot O_{pk}^{k+1}$$

When a logistic function is given as f(i) and $O_{pk}^k = f(net_{pk}^k)$, equation (3) can be rearranged as follows. The logistic (sigmoid) function f(i) is shown in FIG. 4.

$$\partial E_{pj} / \partial W_{ji}^k = -\delta_{pj}^k \cdot O_{pi}^{k+1} \quad (4)$$

where $\delta_{pj}^k$ is an amount of back propagation of an error in the Kth layer, i.e., $\delta_{pj}^k = -\partial E_{pj} / \partial net_{pj}^k$. Therefore, equation (2) can be rearranged as follows:

$$\Delta_p W_{ji}^k = \eta \cdot \delta_{pj}^k \cdot O_{pi}^{k+1} \quad (5)$$

where $\eta$ is a constant.

Since equations $E_{pj} = 0.5(t_{pj} - O_{pj}^0)^2$ and $O_{pj}^0 = f(net_{pj}^0)$ are established for the output layer, the amount of back propagation $\delta_{pj}^0$ of the output layer is defined as follows:

$$\delta_{pj}^0 = (t_{pj} - O_{pj}^0) \cdot f'\left(\sum_k W_{jk}^0 \cdot O_{pk}^1\right) \quad (6)$$

Since there are no connections between the units within each layer, the amount of back propagation of the error of the intermediate layer is given as follows:

$$\begin{aligned}
\delta_{pj}^k &= -\partial E_p / net_{pj}^k \\
&= \sum_k \delta_{pk}^{k-1} \cdot \sum_i \{(\partial net_{pk}^{k-1} / \partial O_{pi}^k) \cdot (\partial O_{pi}^k / \partial net_{pj}^k)\} \\
&= \sum_k \delta_{pk}^{k-1} (\partial net_{pk}^{k-1} / \partial O_{pj}^k) \cdot f'(net_{pj}^k) \\
&= \sum_k \delta_{pk}^{k-1} \cdot W_{kj}^{k-1} \cdot f'(net_{pj}^k) \\
&= \sum_k \delta_{pk}^{k-1} \cdot W_{kj}^{k-1} \cdot f'\left(\sum_k W_{jk}^k \cdot O_{pk}^{k+1}\right)
\end{aligned} \quad (7)$$

$\delta$ in equation (7) is a recursive function. $\Delta_p W_{ji}^k$ is given by a general mathematical expression as follows:

$$\Delta_p W_{ji}^k(n+1) = \eta \cdot \delta_{pj}^k \cdot O_{pi}^{k+1} + \alpha \cdot \Delta_p W_{ji}^k(n) \quad (8)$$

for $\Delta_p W_{ji}^k(0) = 0$ where n is the number of learning cycles. The second term of the right side of equation (8) is added to reduce variations in error and accelerate convergence. The coupling strength coefficient can be updated from equation (8) as follows:

$$W_{ji}^k(n+1) = W_{ji}^k(n) + \Delta_p W_{ji}^k(n) (k=0, 1, 2, \ldots) \quad (9)$$

If the logistic function f(i) is defined as follows:

$$f(i) = 1/(1 + e^{-net_i}) \quad (10)$$

$f'(i) = f(i)\{1 - f(i)\}$ so that the amounts of back propagation of the errors can be simplified as follows:

for output unit:

$$\delta_{pj}^0 = O_{pj}^0 (1 - O_{pj}^0)(t_{pj} - O_{pj}^0) \quad (11)$$

for intermediate unit:

$$\delta_{pj}^k = O_{pj}^k (1 - O_{pj}^k) \cdot \sum_k \{\delta_{pk}^{k-1} \cdot W_{kj}^{k-1}(n+1)\} \quad (12)$$

As is apparent from the above calculations, the $\Delta_p W_{ji}^k$ calculations are started from the units of the output layer and are shifted to the units of the intermediate layer. In this manner, learning is started in a direction opposite to the input data processing direction.

Learning by the BP model can be performed as follows. Learning data is input, and a calculation result is output. The coupling strength coefficients are changed to reduce the error of the result (i.e., the difference between the actual output and the teacher signal). Another learning data is input again. This operation is repeated until $\Delta_p W_{ji}^k$ is converged to zero.

FIG. 5 shows a basic circuit arrangement of a BP model neural network. A random access memory (to be referred to as a RAM hereinafter) 1 stores coupling strength coefficients $W_{ji}^k$ and has N pages for the K (1 to N) layers. A RAM 2 stores changes $\Delta_p W_{ji}^k$ in the coupling strength coefficient $W_{ji}^k$ when the pattern P is input to the neural network and has N pages, i.e., K=1 to N. A RAM 3 stores the amounts of back propagation $\delta_{pj}^k$ of the errors and has (N+1) pages, i.e., K=0 to N. A RAM 4 stores output values $O_{pj}^k$ of all units and has (N+1) pages, i.e., K=0 to N. A page 4a stores output values of the output layer, a page 4b stores output values of the intermediate layer and the input layer, and a page 4c stores input values of the input layer. An $O_{pj}^k$-arithmetic logic unit 5, a $\delta_{pj}^k$-arithmetic logic unit 6, a $\Delta_p W_{ji}^k$-arithmetic logic unit 7, and a $W_{ji}^k$-arithmetic logic unit 8 are connected to the RAMs 4, 3, 2, and 1, respectively. Reference numeral 9 denotes a sequence controller for controlling the overall sequence.

Figure 9:
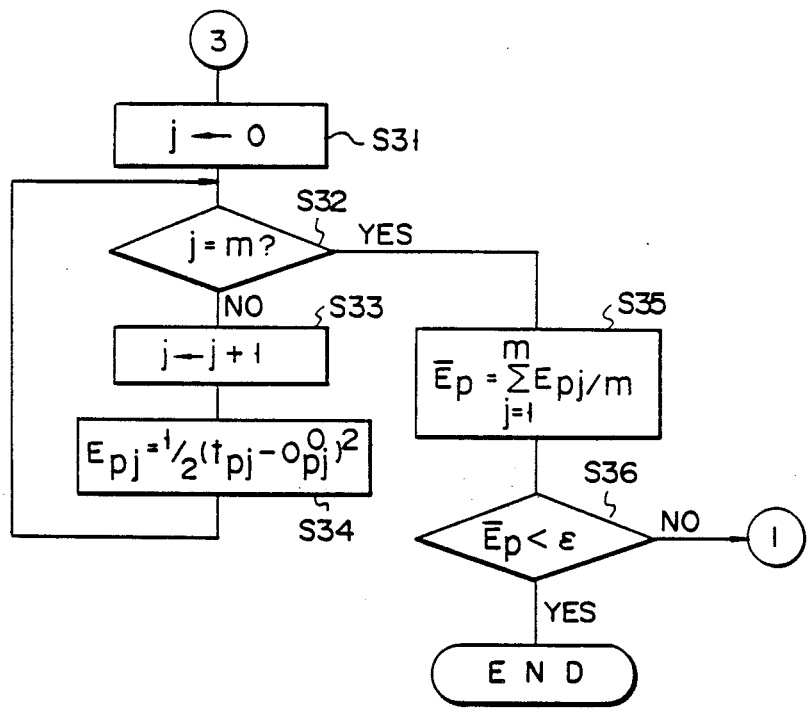

The learning process by the BP model shown in FIG. 5 will be described below. Simulation of the BP model by a Neumann type computer will be described with reference to flow charts of FIGS. 6 to 9. More specifically, FIG. 6 is a flow chart for calculating the output values $O_{pj}^k$, FIG. 7 is a flow chart for calculating the amount of back propagation $\delta_{pj}^k$ of the errors, FIG. 8 is a flow chart for calculating the coupling strength coefficients $W_{ij}^k$, and FIG. 9 is a flow chart for judging a learning level.

A random value is initially set in the coupling strength coefficient $W_{ji}^k$ in the RAM 1 in step S1. In step S2, the input values $O_{pj}^{N+1}$ (j=1 to m) are set in the RAM 4. The output values $O_{pj}^k$ of the respective units are calculated by the arithmetic logic unit 5 from the input layer to the output layer in steps S3 to S9.

Figure 7:
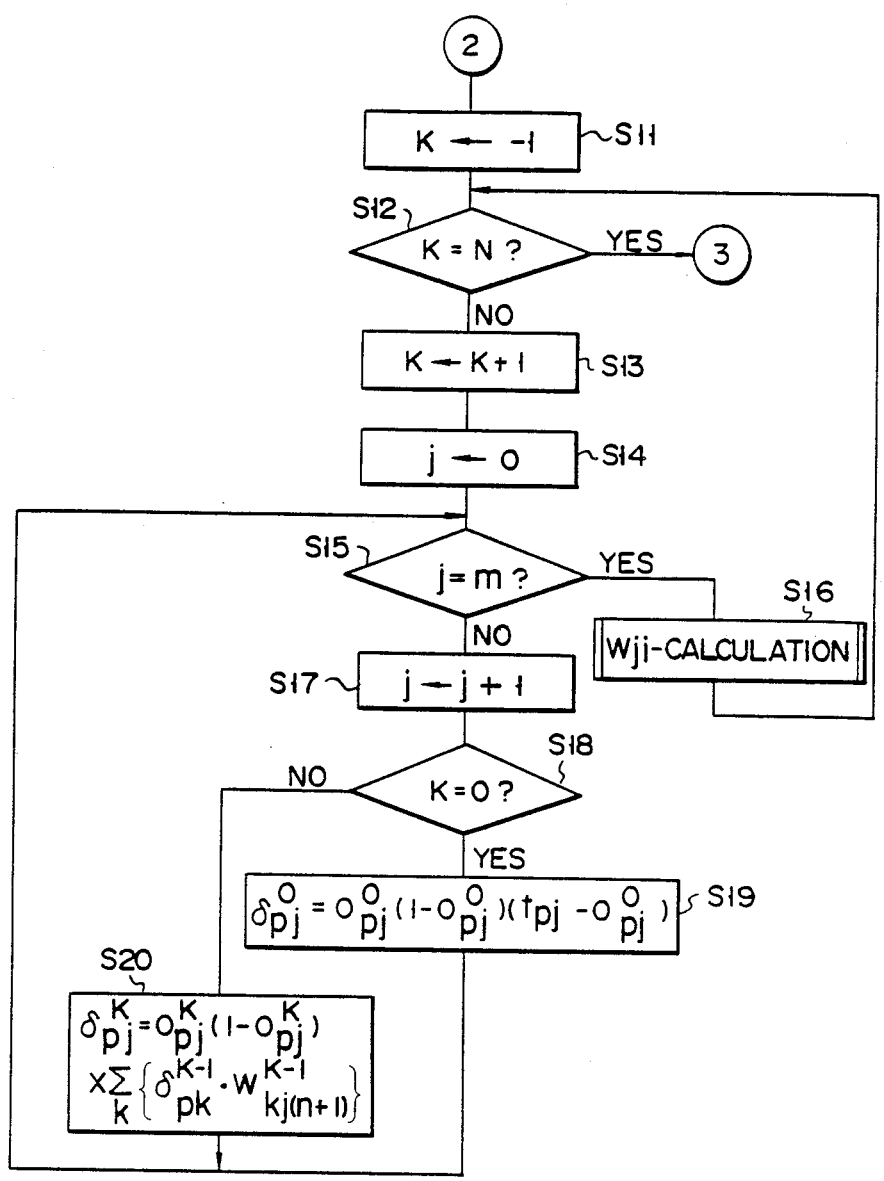

In steps S11 to S20 of FIG. 7, the amount of back propagation $\delta_{pj}^0$ of the errors are calculated in accordance with equation (11) using the output values $O_{pj}^0$ and the teacher signals $t_{pj}$ by the arithmetic logic unit 6.

In steps S21 to step S24 of FIG. 8, changes $\delta_p W_{ji}^0(1)$ in coupling strength coefficients are calculated by the arithmetic logic units 7 in accordance with equation (8). All initial values $\Delta_p W_{ji}^k(0)$ of the changes $\Delta_p W_{ji}^0$ are zero. The coupling strength coefficients $W_{ji}^0(1)$ are calculated by the arithmetic logic unit 8 in accordance with equation (9) in step S25. Therefore, all the $O_{pj}^0$, $\delta_{pj}^0$, $\Delta_p W_{ji}^0(1)$, and $W_{ji}^0(1)$ of the output layer are obtained. These data are stored to update the initial data in the RAMs 1 to 4.

Learning of the intermediate layer is then started. Referring back to the flow chart of FIG. 7, the data $\delta_{pj}^0$ and $W_{ji}^0(1)$ obtained by the arithmetic logic unit 6 and the data $O_{pj}^0$ stored in the RAM 4 are used to obtain the amount of back propagation $\delta_{pj}^k$ of the errors. As shown in the flow chart of FIG. 8, changes $\Delta_p W_{ji}^k(1)$ of the coupling strength coefficients are calculated by the arithmetic logic unit 7 in accordance with equation (8), and coupling strength coefficients $W_{ji}^k(1)$ are calculated by the arithmetic logic unit 8 in accordance with equation (9). The calculated data are stored to update the previous data in the RAMs 1 to 4 in the same manner as in the output layer. The above flow is sequentially repeated toward the input layer (K=N+1) to complete the first learning cycle.

The above learning cycle is repeated a plurality of times to determine the coupling strength coefficients $W_{ji}$ between the units. Therefore, a network for obtaining a desired output value $P_{pj}$ upon inputting of the input value $O_{pj}$ representing the given pattern P can be automatically formed.

FIG. 9 is a flow chart for calculating a mean square error $\overline{E_p}$ between an actual output value $O_{pj}$ and the teacher signal $t_{pj}$. When the mean square error $\overline{E_p}$ is decreased, the actual output value becomes close to the desirable output value. If the error $\overline{E_p}$ is smaller than a threshold value $\epsilon$ relating to a degree of learning or a learning level, learning is completed. Otherwise, learning is repeated.

Learning for one input pattern P has been described above. However, in the exposure control apparatus learning is performed to output a plurality of output patterns corresponding to a plurality of input patterns. Alternatively, it is possible to perform learning to output one specific output pattern in response to plurality of input patterns.

The above BP model can be realized by a Neumann type computer used in existing industrial equipment. However, with this arrangement, a high-speed function by parallel processing as one of the advantages of the neural network cannot be achieved. For this reason, the operations in FIGS. 6 to 9 are preferably parallel-processed by a plurality of computers.

FIG. 10 shows a configuration of a parallel processing system. A plurality of microprocessors $P_1$ to $P_n$ are connected to a host processor 11. The neural network shown in FIG. 2 is divided into local networks which are respectively controlled by the microprocessors $P_1$ to $P_n$. The host processor 11 controls operation timings of the microprocessors $P_1$ to $P_n$ and combines data dispersed in the microprocessors $P_1$ to $P_n$ to perform processing such as pattern recognition. Each of the microprocessors $P_1$ to $P_n$ performs calculations of a plurality of continuous arrays of the output values $O_{pj}$ shown in FIG. 5, such as $O_{p1}$, $O_{p2}$, . . . . The microprocessors $P_1$ to $P_n$ comprise RAMs and arithmetic logic units which are required to calculate the corresponding output values and store the necessary data $\delta_{pj}$, $\Delta W_{ji}$, and $W_{ji}$. When the calculations of all the units shared by the microprocessors are completed, all the microprocessors $P_1$ to $P_n$ synchronously communicate with each other to update the data. The host processor 11 determines the achieved learning level and controls the operation timings of the microprocessors $P_1$ to $P_n$.

When processing such as pattern recognition is performed on the basis of the learning result, a calculation $$O_{pj}^k = f\left(\sum_k W_{jk}^k \cdot O_{pk}^{k+1}\right)$$

is performed from the input layer to the output layer in FIG. 2, thereby obtaining a final output value $O_{pj}^0$. In this case, as shown in FIG. 11, distributed processing by a plurality of microprocessors is performed to achieve a high-speed operation by parallel processing of the neural network.

The circuit shown in FIG. 5 is basically required during learning. However, when a learning result is simply applied, its arrangement can be extremely simplified.

FIG. 11 is a basic circuit arrangement in this case. Input data is input to an arithmetic logic unit 13 through an input device 12 (e.g., an A/D converter), and the arithmetic logic unit 13 sequentially performs calculations $$O_{pj}^k = f\left(\sum_k W_{jk}^k \cdot O_{pk}^{k+1}\right)$$

to obtain output data $O_{pj}^0$. A coefficient memory 14 for storing the coupling strength coefficient $W_{ji}^k$ comprises a ROM or a programmable ROM.

FIG. 12 is a schematic block diagram of a learning system for manufacturing a product to which the learning result is applied. A product 16 incorporates a coefficient memory (ROM) 17 which stores a coupling strength coefficient $W_{ji}^k$. Reference numeral 18 denotes a learning device. A combination of the ROM 17 and the learning device 18 is basically the same as the circuit shown in FIG. 5. When data $W_{ji}^k$ is written in the ROM 17, the product 16 is disconnected from the learning device 18.

The same learning process need not be repeated for identical products. In this case, the ROM 17 may be copied and used for other identical products.

In the above description, learning of the BP model and an application of the learning result are realized by simulation using the existing Neumann type computer because a complicated algorithm is required during learning and it is very difficult for hardware to automatically self-systematize coupling strength coefficients of connections between the units. However, if the coupling strength coefficients $W_{ij}$ are known and the application is limited to a machine which employs the learning result, the BP model shown in FIG. 2 can be constituted by hardware. This concept must be utilized when a high-speed operation is performed by parallel processing and when the BP model is applied to low-end industrial products. This can be achieved by constituting each unit in FIG. 2 by an inverter and replacing the coupling strength coefficient $W_{ij}$ with a resistor network $R_{ij}$. This can be easily achieved by recent LSI techniques.

Figures 13, 14:
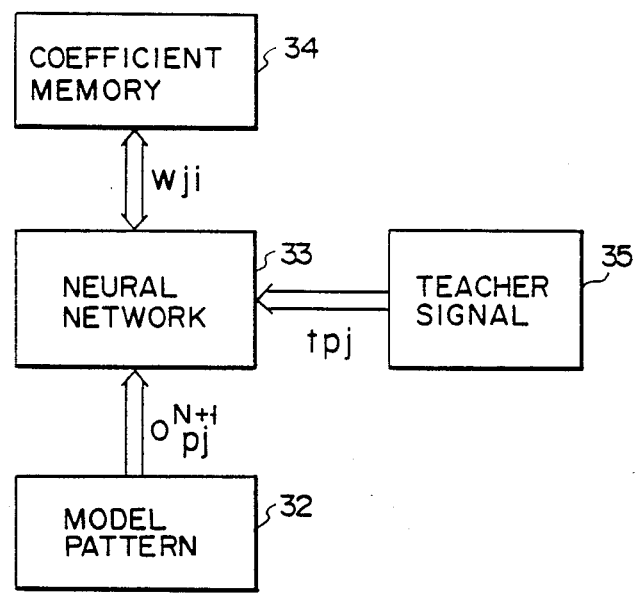
FIG. 13 is a block diagram of an apparatus for causing the neural network of this embodiment to learn.
FIG. 14 is a view showing the layout of photoelectric transducer elements of this embodiment.

An exposure control apparatus which employs the above-mentioned neural network according to the first embodiment of the present invention will be described with reference to FIG. 1. An aperture 19 is located in front of a photographing lens 20. An object image obtained through the aperture 19 is incident on a light-receiving unit 21 formed by arranging photoelectric transducer elements $P_{mn}$ in a two-dimensional matrix, as shown in FIG. 14. For this reason, brightness data of the object in a given closed state of the aperture 19 are output from the light-receiving unit 21 in units of photoelectric transducer elements. An output from the light-receiving unit 21 is amplified by an amplifier 22, and the amplified signal is converted into digital data by an A/D converter 23. The digital data as the BV' value is supplied to an arithmetic logic unit (ALU) 24. The arithmetic logic unit 24 is a circuit for calculating actual object BV values (=BV'—AVo) in units of photoelectric transducer elements. For this reason, a fully open aperture value AVo of aperture 19 is input to the arithmetic logic unit 24.

The BV values output from the arithmetic logic unit 24 in units of photoelectric transducer elements are supplied to a multiplexer 27 and a neural network 25. A coefficient memory 26 is connected to the neural network 25. The multiplexer 27 selectively passes output BV values of the photoelectric transducer elements corresponding to the main part of the object from the output brightness BV values of all the photoelectric transducer elements on the basis of a control signal $P_{xy}$ from the neural network 25.

An output from the multiplexer 27 is supplied to an arithmetic logic unit 28, and the arithmetic logic unit 28 performs an APEX calculation ($BV+SV=TV+AV$) using a brightness value BV, a speed value (film sensitivity) SV, an aperture value (f-number) AV, and a time value (shutter speed) TV, and a mode signal (MOD) representing a shutter or aperture priority operation, thereby determining a shutter speed or an f-number. An output from the arithmetic logic unit 28 is supplied to a shutter control device 29 and an aperture control device 30, thereby controlling exposure. A sequence controller 31 is arranged to perform overall control.

In this embodiment, exposure is controlled not on the basis of the brightness information of the object as a whole but by the brightness information of only the main part. The main part is selected by the neural network in accordance with a brightness distribution pattern of the object. For this reason, satisfactory exposure control can always be performed for every object. The main part of the object may cross a plurality of photoelectric transducer elements. In this case, the arithmetic logic unit 28 calculates an average value of the output BV values of the plurality of photoelectric transducer elements, to provide the brightness value BV.

The basic block arrangement of the neural network 25 shown in FIG. 5 may be used. However, in order to achieve high-speed learning, a parallel processing system shown in FIG. 10 should be used. When an object pattern as an input $O_{pj}^0$ is supplied to the network, a calculation $$O_{pj}^k = f\left(\sum_k W_{jk}^k \cdot O_{pk}^{k+1}\right)$$

is performed, and finally a signal $P_{xy}$ representing the position of the main part of the object is output. In this manner, a coupling strength coefficient $W_{ji}$ of each unit is learnt by the network in advance. The coupling strength coefficients $W_{ji}$ obtained by learning are stored in the coefficient memory 26.

This learning system is shown in FIG. 13. A model pattern 32 is an input unit for inputting various object patterns $O_{pj}^{N+1}$ to a neural network 33 and includes an A/D converter and the like. Position signals $P_{xy}$ (target values) of the main parts corresponding to the various object patterns $O_{pj}^{N+1}$ are input as teacher signals $t_{pj}$ to the neural network 33. The neural network 33 obtains coupling strength coefficients $W_{ji}$ for allowing a coincidence between the actual outputs $O_{pj}^0$ and the corresponding teacher signals $t_{pj}$ by learning. The obtained coupling strength coefficients $W_{ji}$ are stored in a coefficient memory 34. This coefficient memory 34 is incorporated in a camera as the coefficient memory 26 of FIG. 1.

The neural network 25 therefore automatically obtains a main part of an object from an object brightness distribution pattern as an output from the arithmetic logic unit 24 and outputs its position $P_{xy}$.

The neural network has a nature for generating an accurate output for a pattern which is not input during learning if learning is performed to some extent. It is very effective to solve problems (e.g., designation of the main part of the object) which involve human senses and are difficult to be standardized. Learning by the neural network allows self-systematization of a relationship between the main parts of the objects and various types of object patterns which could not be programmed by the existing Neumann type computers. Therefore, desirable exposure control can be performed. In addition, high-speed calculations can be performed by parallel processing in the neural network. Therefore, a neural network is suitable for a camera which requires high-speed operations.

In order to achieve effective learning, in the neural network 25, learning is performed in units of rows of the photoelectric transducer elements $P_{mn}$ by independent neural networks S11, ..., and the independent learning results are synthesized by an output layer So, as shown in FIG. 15. The neural network comprises an input layer 37, an intermediate layer 38, and an output layer 39, and the principle of learning has been described above.

For illustrative convenience, the photoelectric transducer elements $P_{mm}$ form a matrix consisting of four rows and seven columns, as shown in FIG. 16. The main part position $P_{xy}$ denotes any of photoelectric transducer element position $P_{mn}$.

Figure 17A:
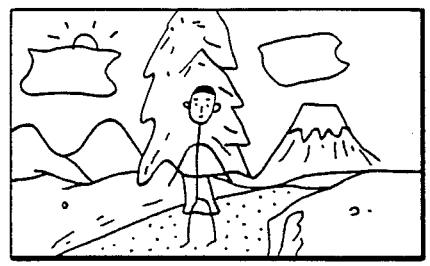
Figure 17B:
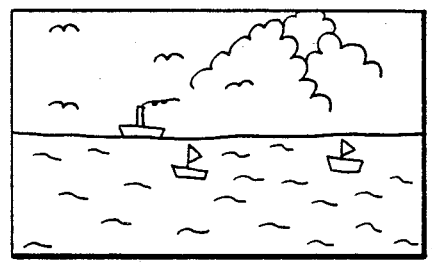
Figure 17C:

FIGS. 17A to 17C show model patterns. FIG. 17A shows a model pattern in back light photographing. In this case, the main part of the object is a man's face, and learning is performed to select the photoelectric transducer element $P_{24}$ as the main part. FIG. 17B shows a model pattern showing a scene of sea. In this case, main parts of the objects ar boats, sea, and sky, and learning is performed to select the photoelectric transducer elements $P_{23}$, $P_{26}$, and $P_{34}$. FIG. 17C shows a scene of a street flooded with varicolored neon lights. In this case, the main parts of the objects are neon lights, and learning is performed to select the photoelectric transducer elements $P_{23}$ and $P_{24}$. Only three object models are exemplified. However, in practice, several hundreds of object patterns are learnt.

According to the first embodiment as described above, the neural network learns to output a desired object main part in response to various object pattern inputs, and exposure control is performed on the basis of the network output. Therefore, there is provided an exposure control apparatus capable of allowing a user to take pictures on the basis of the brightness level of the desired object main part in response to various object pattern inputs.

Figure 18:
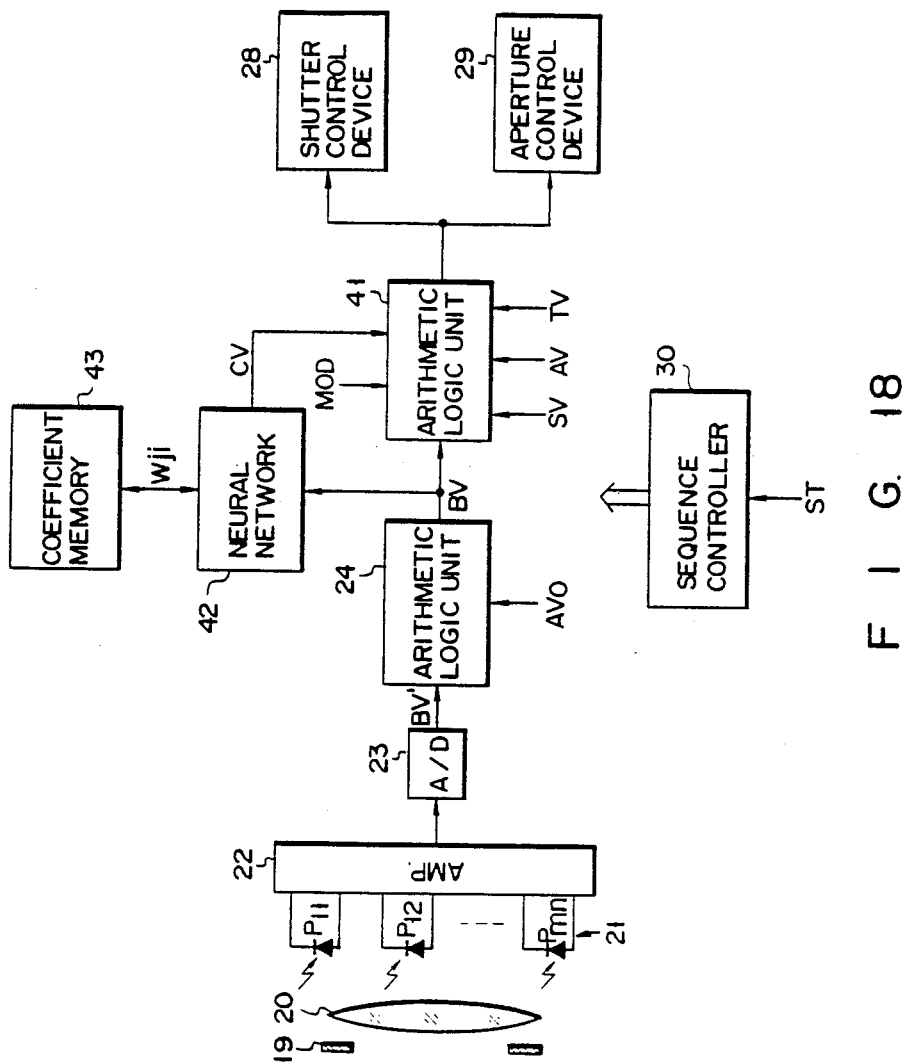
FIG. 18 is a block diagram of an exposure control apparatus according to a second embodiment.

A second embodiment of the present invention will be described with reference to FIG. 18. The arrangement from the aperture 19 to the arithmetic logic unit 24 for outputting actual object brightness values $BV(=BV'-AVo)$ is the same as that of the first embodiment. The BV values of the respective photoelectric transducer elements output from the arithmetic logic unit 24 are supplied to an arithmetic logic unit 41 and a neural network 42. The neural network 42 receives, as an input $O_{pj}{}^0$, a brightness pattern formed of object brightness levels of the photoelectric transducer elements output from the arithmetic logic unit 24 and performs a calculation $$O_{pj}^k = f\left(\sum_k W_{jk}^k \cdot O_{pk}^{k+1}\right)$$

to finally obtain an exposure correction signal CV. The coupling strength coefficient $W_{ji}$ is stored in a coefficient memory 43. The arithmetic logic unit 41 performs an APEX calculation $(BV+SV=TV+AV+CV)$ on the basis of an average value of the brightness values BV within one frame, a speed value SV, an aperture value AV, a time value TV, a mode signal (MOD) representing a shutter or aperture priority operation, and the exposure correction signal CV supplied from the neural network 42, thereby determining a shutter speed or an f-number. An output from the arithmetic logic unit 41 is supplied to a shutter control device 28 and an aperture control device 29, thereby controlling exposure. According to the second embodiment, exposure is controlled in consideration of the correction value obtained for the average photometric value by the neural network 42.

The arrangement of the neural network 42 is the same as that of the first embodiment. A learning example will be described by using the same model patterns in the first embodiment. In back light photographing of FIG. 17A, the correction value is set to be +1 EV, and the user takes a picture of a man with a larger brightness value. In the scene of sea of FIG. 17B, since the sky is so bright that the sea becomes darker, the correction value is set to be +0.5 EV. When the user takes a picture of the scene of a street with varicolored neon lights in FIG. 17C according to a conventional method, the picture is so bright as if it is taken with daylight, thus resulting in a lack of mood. In this case, the correction value is set to be −3 EV. These correction values are set for the average photometric values. Only three cases are exemplified. In practice, several hundreds of patterns are learnt.

According to the second embodiment as described above, the neural network performs learning in advance to output a desired exposure correction value for an average photometric value in response to each of the various object pattern inputs, and exposure control is performed on the basis of the corrected average photometric value. Therefore, there is provided an exposure control apparatus capable of allowing a user to take pictures with a desired exposure correction amount for every object pattern.

The present invention is not limited to the embodiments described above. Various changes and modifications may be made. In the first embodiment, the neural network learns main parts of objects and exposure control is performed on the basis of the brightness information of the main parts. However, it is possible to give a position of a main part of an object as a teacher signal to the neural network, and learning such as a spot photometric operation may be performed. In addition to the brightness of an object as an input parameter of the neural network, other factors such as a temperature and a humidity may be taken into consideration to express a delicate sense of a season which is difficult to formulate.

According to the present invention as has been described above, the neural network performs learning beforehand to produce desired outputs in response to various object patterns, and exposure control is performed on the basis of these outputs. Therefore, there is provided an exposure control apparatus capable of allowing a user to take pictures with desired exposure values for all object patterns.

What is claimed is:

1. An exposure control apparatus for a camera comprising:
   light-receiving means, having a plurality of photoelectric transducer elements arranged in a two-dimensional matrix, for outputting analog signals representing brightnesses of respective parts of an object;
   means for converting the analog signals output from said light-receiving means into digital signals;
   neural network means for receiving the digital signals output from said converting means and determining a main part of the object;
   means for selecting a signal representing the brightness of the main part of the object determined by said neural network means from the digital signals output from said converting means; and
   means for performing exposure control on the basis of an output from said selecting means.

2. An apparatus according to claim 1, in which said neural network means comprises:
   an input layer having a plurality of units connected to an output of said converting means;
   one or a plurality of intermediate layers having a plurality of units coupled to the individual units of said input layer at predetermined coupling strengths; and
   an output layer having a plurality of units coupled to the individual units of said intermediate layer at predetermined coupling strengths.

3. An apparatus according to claim 2, in which said neural network means further comprises a coefficient memory for storing coupling strength coefficients representing the coupling strengths between the units.

4. An apparatus according to claim 1, in which said neural network means comprises a plurality of microprocessors connected in parallel with each other to perform distributed processing.

5. An exposure control apparatus for a camera comprising:
   light-receiving means, having a plurality of photoelectric transducer elements arranged in a two-dimensional matrix, for outputting analog signals representing brightnesses of respective parts of an object;
   means for converting the analog signals output from said light-receiving means into digital signals;
   neural network means for receiving the digital signals output from said converting means and determining an exposure correction value; and
   means for performing exposure control on the basis of the exposure correction values determined by said neural network means and the digital signals output from said converting means.

6. An apparatus according to claim 5, in which said neural network means comprises:
   an input layer having a plurality of units connected to an output of said converting means;
   one or a plurality of intermediate layers having a plurality of units coupled to the individual units of said input layer at predetermined coupling strengths; and
   an output layer having a plurality of units coupled to the individual units of said intermediate layer at predetermined coupling strengths.

7. An apparatus according to claim 6, in which said neural network means further comprises a coefficient memory for storing coupling strength coefficients representing the coupling strengths between the units.

8. An apparatus according to claim 5, in which said neural network means comprises a plurality of microprocessors connected in parallel with each other to perform distributed processing.

9. An apparatus according to claim 5, in which said exposure control means comprises:
   means for obtaining an average value of brightnesses of the respective parts of the object from the digital signals and obtaining an exposure value on the basis of the average value; and
   means for correcting the exposure value on the basis of the exposure correction value.

10. An apparatus according to claim 5, in which said exposure control means comprises:
    means for selecting a photographing mode; and
    means for controlling at least one of a time value and an aperture value on the basis of corrected exposure value in accordance with the selected photographing mode.

11. An exposure control apparatus for a camera comprising:
    light-receiving means, having a plurality of photoelectric transducer elements arranged in a two-dimensional matrix, for outputting signals representing brightnesses of respective parts of an object;
    neural network means for receiving the signals output from said light-receiving unit and performing exposure control, said neural network means comprises an input layer having plurality of units connected to respective groups of said photoelectric transducer elements, one or a plurality of intermediate layers having a plurality of units coupled to the individual units of said input layer at predetermined coupling strengths, and an output layer having a plurality of units coupled to the individual units of said intermediate layer at predetermined coupling strengths; and
    means for causing said neural network means to perform learning in every unit connected to said each group of said converting means.

12. An apparatus according to claim 11, in which said neural network means comprises:
    means for determining a main part of an object from the object brightnesses of the respective parts of the object; and
    means for controlling exposure on the basis of a part of outputs of said light-receiving means which corresponds to the main part.

13. An apparatus according to claim 11, in which said neural network means comprises:
    means for determining an exposure correction value from the brightnesses of the respective parts of the object; and
    means for controlling exposure on the basis of the exposure correction value and the outputs from said light-receiving means.

14. An exposure control apparatus for a camera comprising:
    means for detecting object brightness;

neural network means for inputting an output signal from said detecting means and outputting a signal representing a main part of an object; and means for performing exposure control on the basis of an output from said neural network means and the output signal from said detecting means.

15. An apparatus according to claim 14, in which said neural network means comprises:
- an input layer having a plurality of units connected to an output of said detecting means;
- one or a plurality of intermediate layers having a plurality of units coupled to the individual units of said input layer at predetermined coupling strengths; and
- an output layer having a plurality of units coupled to the individual units of said intermediate layer at predetermined coupling strengths.

16. An apparatus according to claim 15, in which said neural network means further comprises a coefficient memory for storing coupling strength coefficients representing the coupling strengths between the units.

17. An exposure control apparatus for a camera comprising:
- means for detecting object brightness;
- neural network means for receiving an output signal from said detecting means and outputting an exposure correction value; and
- means for performing exposure control on the basis of the exposure correction value output from said neural network means and the output signal from said detecting means.

18. An apparatus according to claim 17, in which said neural network means comprises:
- an input layer having a plurality of units connected to an output of said detecting means;
- one or a plurality of intermediate layers having a plurality of units coupled to the individual units of said input layer at predetermined coupling strengths; and
- an output layer having a plurality of units coupled to the individual units of said intermediate layer at predetermined coupling strengths.

19. An apparatus according to claim 18, in which said neural network means further comprises a coefficient memory for storing coupling strength coefficients representing the coupling strengths between the units.

20. An exposure control apparatus for a camera comprising:
- a plurality of photoelectric transducer elements, arranged in a two-dimensional matrix, for detecting a brightness of an object;
- a back propagation model type neural network, having a large number of units coupled to each other at predetermined strengths determined by pre-learning, for receiving outputs from said plurality of photoelectric transducer elements and calculating an exposure value; and
- means for controlling exposure in response to an output form said neural network.

* * * * *